UNITED STATES PATENT OFFICE.

FRANKLIN L. PUTT AND J. B. STRATTON, OF MIDDLEBURY, INDIANA.

COMPOSITION OF MATTER TO BE USED AS A FIRE AND WATER PROTECTIVE PAINT.

SPECIFICATION forming part of Letters Patent No. 299,088, dated May 20, 1884.

Application filed January 23, 1884. (No specimens.)

*To all whom it may concern:*

Be it known that we, FRANKLIN L. PUTT and J. B. STRATTON, citizens of the United States, residing at Middlebury, county of Elkhart, State of Indiana, have invented a new and useful Composition of Matter to be used as a Fire and Water Proof Protective Paint, of which the following is a specification.

Our composition consists of the following ingredients, combined in the proportions hereinafter stated, viz: first, coal-gas tar, sixty gallons; second, chloride of sodium, thirty pounds; third, Wisconsin mineral paint, one hundred pounds; fourth, Venetian red, fifty pounds; fifth, sulphur sublimate, twenty-five pounds; sixth, resin, (merchant,) twenty-five pounds; seventh, asphaltum, thirty-three gallons; eighth, pulverized alum, twenty-five pounds; ninth, biborate of soda, from twenty to thirty-five pounds; tenth, opaline, two pounds. These ingredients are combined as follows: The coal-gas tar is heated in a vessel over a slow fire. Ingredients No. 2 to No. 9, inclusive, after they have been properly pulverized, by passing through a drug-mill or otherwise, are thoroughly mixed with the opaline, and the mixture is then slowly added to the heated coal-gas tar, with continuous stirring, care being taken not to allow the mixture to boil over. When the compound has thus been thoroughly mixed and reduced by the heat to the proper consistency, it should be applied to the roof or elsewhere, as may be desired, while properly heated, with a suitable brush or other instrument. Should it be desired to apply this paint to metallic posts or other small articles, they may be dipped into the compound. We do not limit ourselves to the mode of its application.

In the use of this paint upon roofs, care should be taken to introduce it into every crevice. Should the roof be old, and decayed material exist thereon, such material should be carefully removed, which may conveniently be accomplished with an ordinary split wooden brush. As thus prepared and applied, the mixture forms a fire and water proof paint, which may be applied to wood, tin, felt, iron, tiling, &c., and is adapted for use either above or under ground. Besides being a protection against fire and water, it is also a prevention against oxidation of metal and decay of timber. It may also be applied to cisterns or tanks for holding water, or to any other construction where water is liable to cause decay or leakage.

We have found the proportions above specified to be very suitable for all purposes; but the proportions could be considerably varied without departing from the principle of our invention. We contemplate, therefore, the mixture of these ingredients in any suitable proportions.

What we claim, and desire to secure by Letters of the United States, is—

The herein-described composition of materials to be used as a paint, consisting of coal-gas tar, chloride of sodium, Wisconsin mineral paint, Venetian red, sulphur sublimate, resin, (merchant,) asphaltum, pulverized alum, biborate of soda, and opaline, mixed in suitable proportions, and in the manner described.

In testimony whereof we sign this specification in the presence of two witnesses.

FRANKLIN L. PUTT.
J. B. STRATTON.

Witnesses:
CHANCEY D. SCHROCK,
HENRY J. SCHROCK.